United States Patent [19]

Baatz et al.

[11] Patent Number: 4,706,083

[45] Date of Patent: Nov. 10, 1987

[54] FUEL ECONOMY INDICATOR

[75] Inventors: Wilfried Baatz, Bellevue; Norman C. Ahlquist, Seattle, both of Wash.

[73] Assignee: FloScan Instrument Company, Inc., Seattle, Wash.

[21] Appl. No.: 858,879

[22] Filed: May 2, 1986

Related U.S. Application Data

[63] Continuation of Ser. No. 553,082, Nov. 18, 1983, abandoned.

[51] Int. Cl.⁴ .............................................. H04Q 1/00
[52] U.S. Cl. ................................ 340/825.06; 73/113; 73/114; 364/442
[58] Field of Search .......................... 364/442, 825.06; 340/722, 753, 754

[56] References Cited

U.S. PATENT DOCUMENTS

| 3,487,308 | 12/1969 | Johnson | 340/722 |
| 3,594,757 | 7/1971 | Gard | 340/724 |
| 4,011,439 | 3/1977 | Bennett | 364/761 |
| 4,079,623 | 3/1978 | Erwin, Jr. | 73/113 |
| 4,155,038 | 5/1979 | Merklinger et al. | 364/850 |
| 4,183,025 | 1/1980 | Kutanugi | 340/753 |
| 4,348,666 | 9/1982 | Ogita | 340/753 |

FOREIGN PATENT DOCUMENTS 2416455  2/1978  France .

Primary Examiner—Ulysses Weldon
Attorney, Agent, or Firm—Christensen, O'Connor, Johnson & Kindness

[57] ABSTRACT

A fuel economy indicator for vehicles having liquid fuel engines. The indicator comprises fuel flow and vehicle speed sensors, and means for using the information provided by such sensors to determine and display a performance ratio, consisting of the ratio of the instantaneous rate of fuel usage to the average rate of fuel usage.

14 Claims, 4 Drawing Figures

FUEL ECONOMY INDICATOR

This application is a continuation application based on prior copending application Ser. No. 553,082, filed Nov. 18, 1983, now abandoned.

BACKGROUND OF THE INVENTION

Fuel economy indicators are generally known in which the instantaneous value of miles-per-gallon is displayed to the vehicle operator by means of an analog or digital display. The miles-per-gallon value is computed using sensors which provide the instantaneous rates of fuel usage and vehicle speed. Indicators of this type require careful calibration to perform properly, and have failed to achieve widespread acceptance. In addition, a special problem arises in adapting them for use with diesel engines, since the design of diesel engine fuel systems is such that a portion of the fuel flowing to the engine is returned unconsumed to the fuel tank.

In one type of diesel engine fuel system, the ratio between total fuel flow and fuel consumption varies continuously. In such a system, there is no single point where a flow sensor can be placed to measure the fuel consumed. Two methods have been devised to provide fuel economy indicators for such systems. The first involves the use of two flow sensors, one to measure the total flow from the tank to the engine, and the second to measure the return flow from the engine to the tank, with the fuel consumed being calculated electronically by subtraction. To achieve accurate flow measurements using two sensors, it is necessary either to use two sensors closely matched for absolute accuracy, or to provide means for individual calibration of each flow sensor to compensate for their accuracy differences. Either approach adds substantially to the cost of the instrument. To achieve high levels of absolute accuracy using volumetric flow sensors, it is also necessary to measure the return flow temperature and compensate electronically for the effect of its higher temperature upon the specific gravity and viscosity of the fuel.

A second technique that can be used for variable ratio diesel fuel systems is to modify the system by adding an intermediate return flow tank which recycles the return flow directly to the engine. In this system, the flow from the main fuel tank to the engine equals the fuel consumed and this value

BACKGROUND OF THE INVENTION

Fuel economy indicators are generally known in which the instantaneous value of miles-per-gallon is displayed to the vehicle operator by means of an analog or digital display. The miles-per-gallon value is computed using sensors which provide the instantaneous rates of fuel usage and vehicle speed. Indicators of this type require careful calibration to perform properly, and have failed to achieve widespread acceptance. In addition, a special problem arises in adapting them for use with diesel engines, since the design of diesel engine fuel systems is such that a portion of the fuel flowing to the engine is returned unconsumed to the fuel tank.

In one type of diesel engine fuel system, the ratio between total fuel flow and fuel consumption varies continuously. In such a system, there is no single point where a flow sensor can be placed to measure the fuel consumed. Two methods have been devised to provide fuel economy indicators for such systems. The first involves the use of two flow sensors, one to measure the total flow from the tank to the engine, and the second to measure the return flow from the engine to the tank, with the fuel consumed being calculated electronically by subtraction. To achieve accurate flow measurements using two sensors, it is necessary either to use two sensors closely matched for absolute accuracy, or to provide means for individual calibration of each flow sensor to compensate for their accuracy differences. Either approach adds substantially to the cost of the instrument. To achieve high levels of absolute accuracy using volumetric flow sensors, it is also necessary to measure the return flow temperature and compensate electronically for the effect of its higher temperature upon the specific gravity and viscosity of the fuel.

A second technique that can be used for variable ratio diesel fuel systems is to modify the system by adding an intermediate return flow tank which recycles the return flow directly to the engine. In this system, the flow from the main fuel tank to the engine equals the fuel consumed and this value can be measured directly with a single flow sensor placed between the main tank and the return tank. However, it has been found that intermediate return flow tanks adversely affect the system's heat balance under both summer and winter operating conditions. In summer, the return flow tank increases the fuel temperature, thereby reducing power output and in extreme conditions causing engine damage. In winter, by eliminating the hot return flow to the main tank, the fuel temperature in the main tank is reduced, leading to increased risk of engine shutdown due to wax build-up in the fuel line and filters when the fuel temperature drops below the cloud point. These problems are of such importance and frequency as to severely restrict the widespread adoption by the trucking industry of fuel economy indicators which depend upon return flow tanks.

In another principal type of diesel engine fuel system, the ratio of total fuel flow to fuel consumed is relatively fixed for an individual engine. In a fixed ratio engine, a single flow sensor can be used to measure total fuel flow, and fuel consumption can then be calculated electronically using that engine's ratio. The ratio for an individual engine is fixed by the profile of a cam which regulates the position of the fuel injector which acts as a valve ultimately directing fuel into the engine and then to the return lines of the tank. Because of the large number of cam profiles in use, it is necessary to have a multitude of models, or an expensive means of calibrating each individual instrument, to achieve accurate flow measurement in absolute terms.

SUMMARY OF THE INVENTION

The present invention provides a novel fuel economy indicator which can be universally applied to all conventional fuel systems without individual calibration, close matching of sensors, temperature compensation or, intermediate flow tanks. The fuel economy indicator comprises sensors for producing electrical signals indicative of the vehicle's fuel consumption and speed, and means for using the information provided by such sensors to determine and display a performance ratio, consisting of the ratio of the instantaneous rate of fuel usage to the average rate of fuel usage.

The employment of an instantaneous/average ratio results in a number of surprising and significant advantages over conventional fuel economy devices. For example, precise calibration of fuel flow meters is no longer necessary. Any error in fuel flow rate will affect both the numerator and denominator of the performance ratio, and will thus cancel itself. With the present invention, it is sufficient that the speed and fuel sensors be linear, and the result is an accurate and cost effective fuel economy indicator.

One embodiment of the present invention employs two fuel flow sensors and is especially suited for engines, such as variable ratio diesel engines, in which the return flow must be taken into account in determining fuel economy. This embodiment comprises a speed sensor, a flow sensor, a return flow sensor, and means for calculating the performance ratio consisting of the ratio of instantaneous fuel usage to average fuel usage. As mentioned, the absolute accuracy of the flow sensors is unimportant, because any inaccuracies cancel out in the calculation of the performance ratio. Calibration and close matching of flow sensors is therefore unnecessary.

A second embodiment of the present invention is adapted for those fuel systems in which net fuel consumption can be measured by a single sensor. In this embodiment, the sensor means comprises a speed sensor and a single fuel flow sensor, and the signals from these sensors are used directly to produce the performance ratio.

The fuel economy indicators of the present invention have an advantage over conventional fuel economy indicators in terms of the information they convey to the vehicle operator. The average fuel economy of a commercial truck varies greatly depending upon conditions which are beyond the driver's control, such as vehicle load and weather. The instantaneous/average indicator described herein automatically allows for uncontrollable conditions and provides the driver with a relative measure of his effectiveness in managing the variables under his control, such as gear ratio, vehicle speed and rate of acceleration.

DETAILED DESCRIPTION OF THE INVENTION

Figure 1:
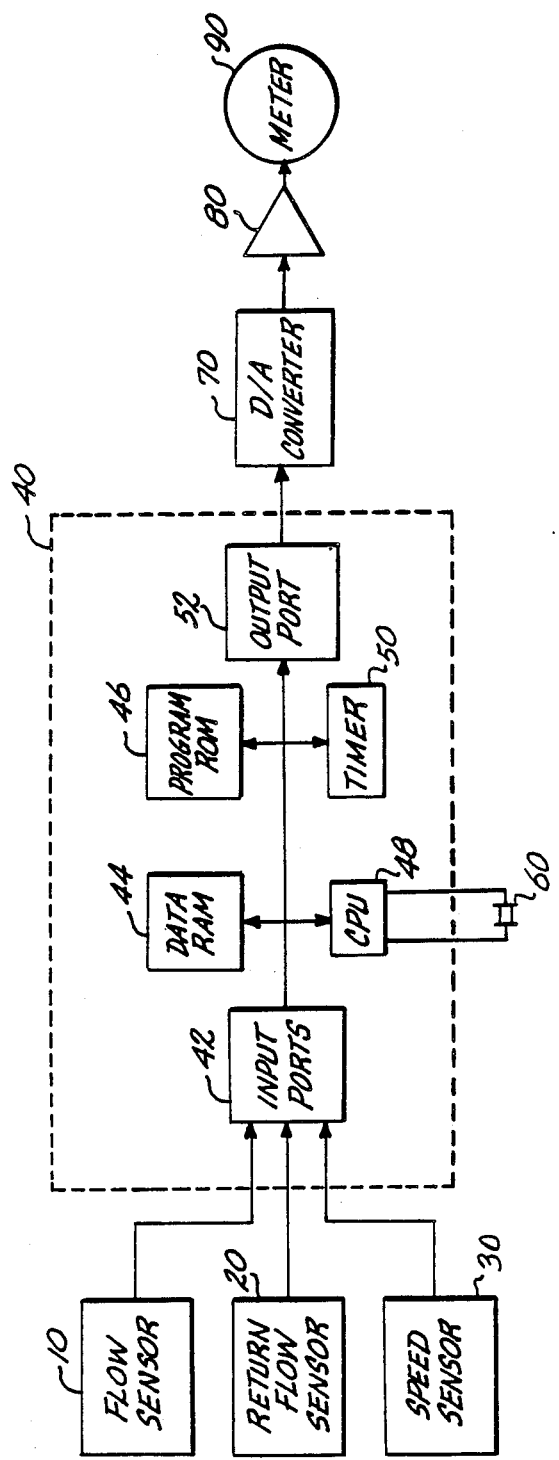
FIG. 1 is a block diagram of an apparatus in accordance with a preferred embodiment of the present invention.

One preferred embodiment of the present invention is shown in block diagram form in FIG. 1. The invention includes flow sensors 10 and 20, speed sensor 30, microprocessor 40, and display means comprising digital-to-analog converter 70, driver 80 and meter 90. The sensors monitor the instantaneous rate of fuel consumption (e.g., gallons-per-hour) and vehicle speed (e.g., miles-per-hour) and convey such information to microprocessor 40. The microprocessor uses this information to compute the instantaneous and average rates of fuel consumption per distance traveled, and a performance ratio consisting of the ratio of the instantaneous rate to the average rate. The performance ratio is then output to digital-to-analog converter 70 and displayed to the vehicle operator via driver 80 and meter 90. Alternately, digital means such as an LED or LCD display could be used in place of meter 90.

Flow sensor 10 is positioned in the fuel line of the vehicle at a position where it can measure the total fuel flow to the engine. For purposes of the present invention, the flow sensor should be capable of producing an electrical signal corresponding to the rate or amount of fuel flow. In a preferred embodiment, sensor 10 provides a train of pulses such that the total number of pulses during a given time period corresponds to the volume of fuel in that time period. In contrast to prior fuel economy systems, the exact ratio between the number of pulses and fuel flow is unimportant, so long as they are linearally related. Of course, a sensor having a known, nonlinear relationship between flow and output signal would also be suitable.

For applications in which return flow must be taken into account, the present invention includes return flow sensor 20 positioned in the return flow line. In a preferred embodiment, returned flow sensor 20 produces a train of pulses whose number corresponds to fuel flow, as described for flow sensor 10.

Speed sensor 30 can be of any conventional design capable of sensing motion of the vehicle or its drive train, and providing an electrical signal corresponding to vehicle speed. As with sensors 10 and 20, a preferred embodiment of the present invention is one in which speed sensor 30 outputs a train of pulses, such that the number of pulses in any given time period corresponds to the distance traveled by the vehicle in such time period.

In the embodiment shown in FIG. 1, signals from sensors 10, 20, and 30 are received and processed by microprocessor 40. The microprocessor comprises conventional elements including input ports 42, data RAM 44, program ROM 46, CPU 48, timer 50 and output port 52. An external crystal 60 is used to control system timing. Suitable microprocessors for the present invention include the 8020 microprocessor available from Intel Corporation and the COPS microprocessor available from National Semiconductor Corporation. It is to be understood that the functions performed by the microprocessor 40 could also be performed by appropriate combinations of simpler circuit elements such as counters, gates, latches and dividers or suitable analog means, and that the invention is not to be construed as limited to the microprocessor embodiment shown in FIG. 1.

For some sensor/microprocessor combinations, it may be necessary to pass the signal from the sensor through appropriate wave shaping circuitry before applying the signal to the microprocessor input port. For example, a common type of speed sensor 30 comprises a variable reluctance generator in which the output pulses are in the form of a variable amplitude sine wave. If input port 42 is not equipped with suitable zero crossing detector means, then it would be preferrable to interpose conventional wave shaping means between speed sensor 30 and input port 42 to convert such pulses into a square wave form.

Figure 2:
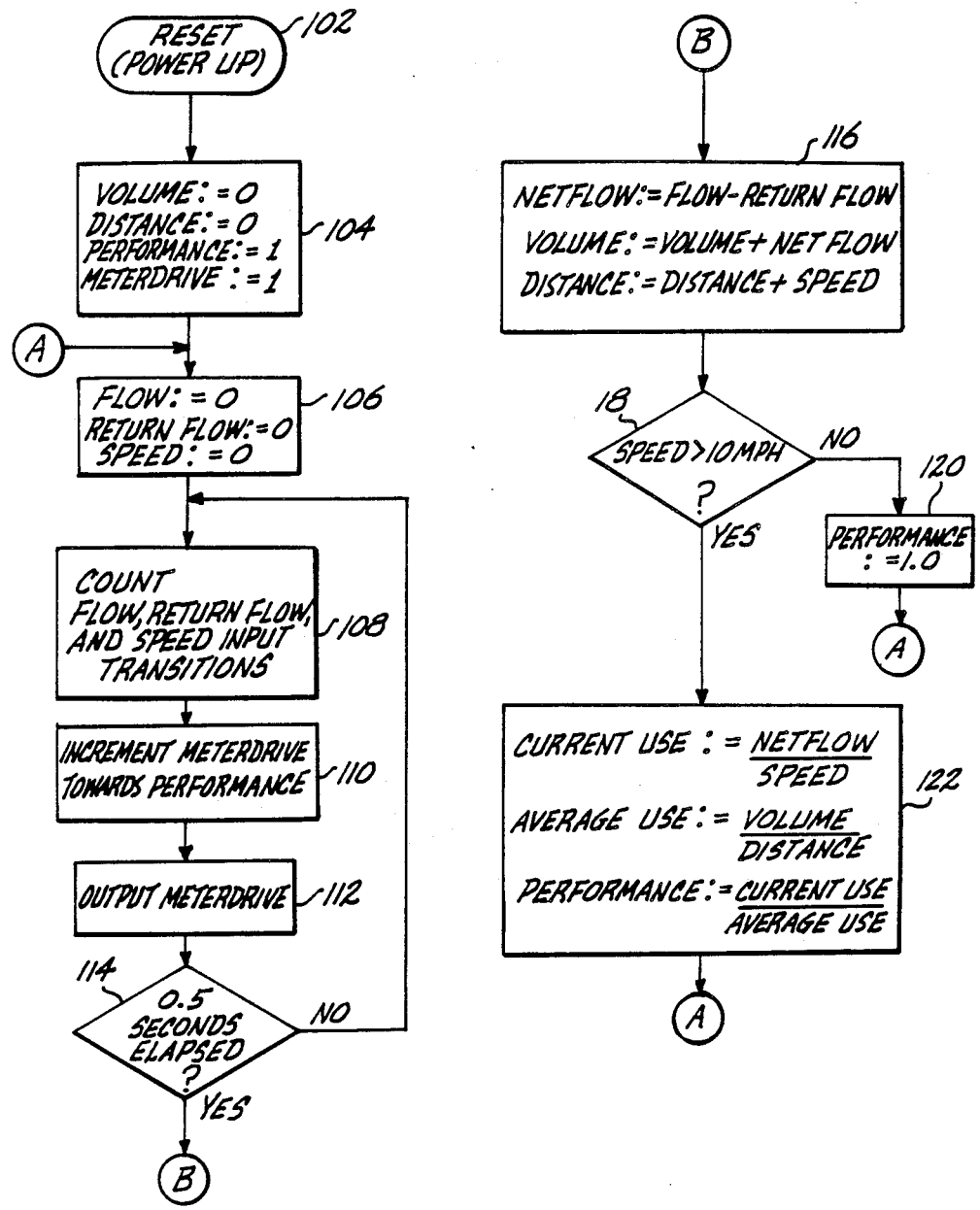
FIG. 2 is a flow chart of the operations performed in connection with a preferred embodiment of the present invention.

FIG. 2 provides a flow chart suitable for operating microprocessor 40 for the perferred embodiment described above in which the signals from sensors 10, 20 and 30 comprise trains of pulses whose numbers correspond to fuel flow and distance traveled. Block 102 represents the point at which program execution begins when microprocessor 40 is powered on. Blocks 104 and 106 initialize variables as indicated. The program then enters a loop consisting of blocks 108, 110, 112 and 114.

Block 108 counts the transitions appearing at the input ports for flow sensor 10, return flow sensor 20 and speed sensor 30, storing the counts in variables FLOW, RETURN FLOW and SPEED respectively. Block 110 increments output variable METERDRIVE towards target variable PERFORMANCE, the size of the increment being adjusted as described below. Block 112 sends the value of METERDRIVE to the output port. Block 114 then determines whether 0.5 seconds have elapsed and, if not, the program jumps back to block 108 and continues looping.

Block 108 counts pulses by testing the value (high or low) at each input port and comparing the value obtained with the prior value for that port. When a transition has been detected at a port, the variable corresponding to that port is incremented by one. Optionally, a test may be added to provide that a transition (e.g., low to high) be ignored unless the following value (e.g., high) confirms that it was a true transition and not simply noise.

After counting pulses for 0.5 seconds, the program proceeds to blcok 116 where variables NET FLOW, VOLUME and DISTANCE are calculated as indicated. Block 118 then checks to see if the value for the variable SPEED corresponds to a vehicle speed of greater than 10 miles per hour. If not, the program sets the variable PERFORMANCE to 1.0 and jumps back to point A. The purpose of this test is to avoid dividing by zero, and to ensure that the meter reading always returns to the same point when the vehicle comes to a stop.

If the vehicle speed exceeds 10 miles per hour, the program proceeds to block 122 and calculates variables CURRENT USE, AVERAGE USE and PERFORMANCE. CURRENT USE is the fuel consumption per unit distance during the previous 0.5 seconds and thus represents the "instantaneous" vehicle fuel economy. AVERAGE USE is the average vehicle fuel consumption per unit distance since system reset. PERFORMANCE is thus the ratio of the instantaneous fuel consumption to the average fuel consumption. PERFORMANCE values greater than 1.0 indicate that the vehicle's current fuel economy is comparatively low, while values less than 1.0 indicate comparatively good current fuel economy. It should be apparent that the calculations indicated in block 122 can be performed in a number of algebraically equivalent ways. For example, PERFORMANCE could be expressed as NET-FLOW/VOLUME divided by DISTANCE/SPEED. AFter determining the value of PERFORMANCE, the program returns to point A, resets the count variables to zero, and reenters the counting/output loop beginning at block 108.

The value of PERFORMANCE is not output directly. Instead, it is converted by block 110 into variable METERDRIVE, and METERDRIVE is sent to parallel output port 52 by block 112. Digital to analog converter 70 then converts the METERDRIVE value to an analog signal which controls meter 90 via driver 80. Block 110 performs a damping function to prevent overdriving of meter 90 by rapid changes in the PERFORMANCE value. In one preferred embodiment, block 110 stores 16 values corresponding to the values of the variable PERFORMANCE each 0.125 seconds during the past two seconds, and calculates METERDRIVE by taking the average of such 16 values. The current value of METERDRIVE is sent to output port 52 each time the program moves through block 112.

In a preferred embodiment, meter 90 is a center zero meter, and driver 80 is adapted to drive the meter to the left when METERDRIVE is greater than 1.0, to drive it to the right when METERDRIVE is less than 1.0, and to provide no driving signal when METERDRIVE equals 1.0. A conventional dual op-amp constant current driver is suitable. The driver may also include additional damping means to supplement the damping provided by block 110. Such additional damping means can comprise a single pole, low pass filter having a time constant on the order of 0.5 seconds.

Figure 3:
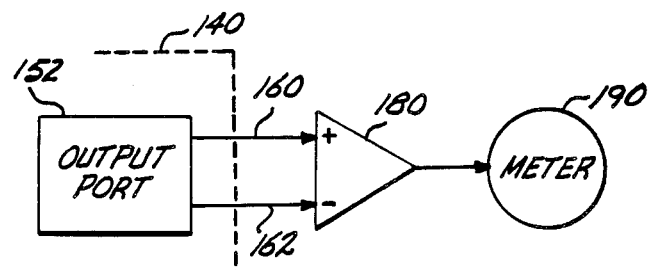
FIG. 3 is a partial block diagram of a second preferred embodiment of the present invention.
Figure 4:
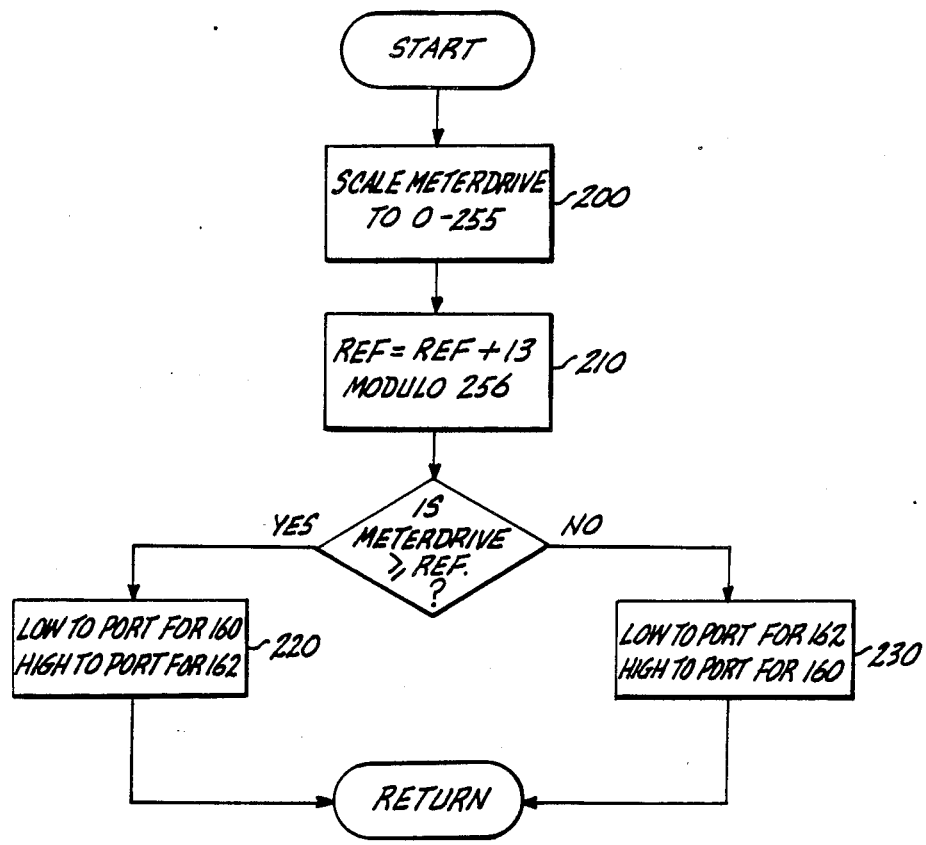
FIG. 4 is a partial flow chart of the operations performed in connection with a preferred embodiment of the present invention.

A second preferred embodiment of the present invention is illustrated in partial schematic form in FIG. 3. In this embodiment, the position of meter 190 is determined by the signals (high or low) on two single lines 160 and 162 which operate through a differential driver 180. Driver 180 may comprise a conventional differential op-amp, with damping means similar to that described for driver 80. The signals on lines 160 and 162 are set by microprocessor 140 through output port 152. For purposes of the present description, it will be assumed driver 180 is responsive to a low signal on line 160 to move meter 190 to the right, and to a low signal on line 162 to move meter 190 to the left, although other arrangements are also suitable. The actual position of the meter is determined by the fraction of time that line 160 is pulled low compared to the fraction of time that line 162 is pulled low. Signals on lines 160 and 162 are determined by the microprocessor using a program identical to the one shown in FIG. 2, except that output block 112 is not present. Instead, the program transfers control at evenly spaced time intervals (e.g. every millisecond) to an output subroutine such as the one shown in block diagram form in FIG. 4. The calling of the FIG. 4 subroutine is controlled by conventional interrupt or polling techniques.

The subroutine updates the values being sent to output port 152 by comparing the value of METERDRIVE to the value of variable REF. When the FIG. 4 subroutine is called, block 200 scales METERDRIVE to a value in the range 0–255, such that a value of 128 corresponds to a METERDRIVE value of 1.0. Block 210 then updates REF by adding 13 to it modulo 256. Block 220 or 230 then drive lines 160 or 162 respectively (by pulling them low), depending on whether or not METERDRIVE is less than REF. Increments other than 13 may be used in block 210. However, it is preferable for the increment to be a prime number, since a prime increment insures that in 256 consecutive iterations through block 210, e.g. in about 0.256 seconds, REF will take on all values from zero through 255 exactly once. Thus for a METERDRIVE value of 1.0, lines 160 and 162 will on the average be pulled low with equal frequency, and meter 190 will read at its center position. However, when METERDRIVE is less than 1.0, then block 230 will be executed more often than in block 220, with the result that line 162 will be pulled low more often than line 160, and meter 190 will read right of center. In a corresponding fashion, a METERDRIVE value greater than 1.0 will result in a left of center reading for meter 190.

It will be understood that the invention may be embodied in other specific forms without departing from the spirit or central characteristics thereof. The described embodiments, therefore, are to be considered in all respects as illustrative, and the invention is not to be limited to the details thereof, but may be modified within the scope of the following claims.

We claim:

1. An indicator for a vehicle having a liquid fuel consuming engine for indicating the relative rate at which the vehicle is consuming fuel, comprising:
   sensor means for producing electrical signals indicative of the vehicle's fuel consumption and distance traveled;
   electronic processing means responsive to said signals for producing an output signal indicative of the ratio of the instantaneous rate of fuel consumed per distance traveled to the average rate of fuel consumed per distance traveled; and
   display means for displaying said output signal.

2. The indicator of claim 1, wherein the sensor means comprises a speed sensor for producing a first electrical signal indicative of vehicle distance traveled, and a flow sensor for producing a second electrical signal indicative of the amount of fuel flow to the engine.

3. The indicator of claim 2, wherein said first electrical signal comprises a series of first pulses, the number of first pulses corresponding to the distance traveled by the vehicle, and wherein the second electrical signal comprises a series of second pulses, the number of second pulses corresponding to the amount of fuel flow to the engine.

4. The indicator of claim 3, wherein the processing means comprises means for receiving the first and second electrical signals, means for producing separate counts of the numbers of first and second pulses, and means for determining said ratio based upon said counts.

5. The indicator of claim 2, wherein the sensor means further comprises a return flow sensor for producing a third electrical signal indicative of the amount of fuel flow from the engine.

6. The indicator of claim 5, wherein said first electrical signal comprises a series of first pulses, the number of first pulses corresponding to the distance traveled by the vehicle, the second electrical signal comprises a series of second pulses, the number of second pulses corresponding to the amount of fuel flow to the engine, and said third electrical signal comprises a series of third pulses, the number of third pulses corresponding to the amount of fuel flow from the engine.

7. The indicator of claim 6, wherein the processing means comprises means for receiving the first, second and third electrical signals, means for producing separate counts of the numbers of first, second and third pulses, and means for determining said ratio based upon said counts.

8. The indicator of claim 1, wherein the processing means comprises means for converting said ratio to a drive signal, means for receiving the drive signal and for damping the rate of cahnge of said drive signal to produce a damped drive signal, and means for receiving the damped drive signal and for determining said output signal based on said damped drive signal.

9. The indicator of claim 1, wherein the display means comprises a digital to analog converter connected to receive said output signal and produce an analog signal corresponding thereto, and a meter responsive to said analog signal to display the value of said ratio, the meter including indicator means physically deflectable in either a first or second direction and driver means for deflecting the indicator means in the first direction when said ratio is less than one and in the second direction when said ratio is greater than one.

10. The indicator of claim 9, wherein the processing means comprises means for converting said drive signal into first and second output signals, and wherein the driver means includes means for deflecting said indicator means in the first direction in response to said first output signal and in the second direction in response to said second output signal.

11. The indicator of claim 10, wherein the means for converting said drive signal to said first and second output signals comprises means for comparing said drive signal to a predetermined reference value.

12. The indicator of claim 11, wherein the means for converting said drive signal to said first and second output signals further comprises means for incrementing the predetermined reference value at evenly spaced points of time such that the values taken on by the predetermined reference value repeat themselves at a fixed time interval.

13. The indicator claim 12, wherein the interval between successive points of time is on the order of 0.5 seconds.

14. The indicator of claim 8, wherein the processing means comprises a microprocessor operating under the control of a stored program.

* * * * *

UNITED STATES PATENT AND TRADEMARK OFFICE
CERTIFICATE OF CORRECTION

PATENT NO. : 4,706,083
DATED : November 10, 1987
INVENTOR(S) : Baatz et al.

It is certified that error appears in the above-identified patent and that said Letters Patent is hereby corrected as shown below:

Column 1, lines 7-47:   Delete entire text "BACKGROUND . . . this value"
Column 5, line 22:      "blcok" should be --block--
Column 5, line 50:      "AFter" should be --After--

Column 8, line 8:       "cahnge" should be --change--
Column 8, line 40:      insert --of-- after "indicator"

Signed and Sealed this

Seventeenth Day of May, 1988

Attest:

DONALD J. QUIGG

*Attesting Officer*    *Commissioner of Patents and Trademarks*